(12) United States Patent
Hietbrink et al.

(10) Patent No.: US 10,906,616 B2
(45) Date of Patent: Feb. 2, 2021

(54) LIGHT GUIDES WITH COATING TO BE USED IN WATER

(71) Applicant: KONINKLIJKE PHILIPS N.V., Eindhoven (NL)

(72) Inventors: Roelant Boudewijn Hietbrink, Utrecht (NL); Bart Andre Salters, Eindhoven (NL); Willem-Jan Arend De Wijs, Oss (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/309,629

(22) PCT Filed: Jun. 29, 2017

(86) PCT No.: PCT/EP2017/066103
§ 371 (c)(1),
(2) Date: Dec. 13, 2018

(87) PCT Pub. No.: WO2018/002205
PCT Pub. Date: Jan. 4, 2018

(65) Prior Publication Data
US 2019/0310413 A1  Oct. 10, 2019

(30) Foreign Application Priority Data

Jun. 29, 2016 (EP) .................................... 16176774
Jun. 27, 2017 (EP) .................................... 17178199

(51) Int. Cl.
*B63B 59/04* (2006.01)
*F21V 8/00* (2006.01)
(Continued)

(52) U.S. Cl.
CPC ............ *B63B 59/04* (2013.01); *G02B 6/0018* (2013.01); *G02B 6/0031* (2013.01);
(Continued)

(58) Field of Classification Search
CPC ....... B08B 17/02; B08B 7/0057; B08B 9/023; B63B 59/04; B63B 59/08; B63B 13/00; B63B 13/02; B63B 2013/005; B63B 3/66
See application file for complete search history.

(56) References Cited

U.S. PATENT DOCUMENTS

| 4,271,210 A | 6/1981 | Yoldas |
| 6,418,257 B1 | 7/2002 | Nath |

(Continued)

FOREIGN PATENT DOCUMENTS

| WO | 2012125271 A1 | 9/2012 |
| WO | 2014188347 A1 | 11/2014 |

(Continued)

OTHER PUBLICATIONS

Hale, G. et al., "Optical Constants of Water in the 200-nm to 200-μm Wavelength Region", Applied Optics, vol. 12, No. 3, Mar. 1973.
(Continued)

*Primary Examiner* — Ryan A Lepisto
*Assistant Examiner* — Erin D Chiem

(57) ABSTRACT

The invention provides a light guide element (1300) comprising a light guide (300), wherein the light guide (300) in comprises a first light guide face (301) and a second light guide face (302) with UV radiation transmissive light guide material (305) between the first light guide face (301) and the second light guide face (302), wherein the light guide element (1300) further comprises one or more of: (i) a first layer element (30) in contact with the first light guide face (301), wherein the first layer element (30) is transmissive for UV radiation; and (ii) a second layer element (130) in contact with the second light guide face (301), wherein the second layer element (130) has one or more functionalities selected from the group consisting of (a) reflective for UV radiation, (b) adhesive for adhering the light guide (300) to (Continued)

an object, (c) reinforcing the light guide element (1300), and (d) protective for the light guide (300).

14 Claims, 7 Drawing Sheets

(51) Int. Cl.
    *B63B 59/08*     (2006.01)
    *B63B 7/00*     (2020.01)
    *B63B 59/06*     (2006.01)
    *G02B 6/10*     (2006.01)
    *B08B 7/00*     (2006.01)
(52) U.S. Cl.
    CPC .......... *G02B 6/0055* (2013.01); *B08B 7/0057* (2013.01); *B63B 59/06* (2013.01); *B63B 59/08* (2013.01); *G02B 6/102* (2013.01)

(56) References Cited

U.S. PATENT DOCUMENTS

| | | |
|---|---|---|
| 8,158,981 B2 | 4/2012 | Abe et al. |
| 2004/0022050 A1 | 2/2004 | Yamashita et al. |
| 2011/0111203 A1 | 5/2011 | Roemer-Scheuermann et al. |
| 2012/0237676 A1 | 9/2012 | Kalyankar et al. |
| 2013/0048877 A1 | 2/2013 | Thoren et al. |
| 2014/0196745 A1* | 7/2014 | Whelan .................. B63B 59/04 134/1 |
| 2016/0137276 A1* | 5/2016 | Salters .................... B08B 17/02 114/222 |

FOREIGN PATENT DOCUMENTS

| | | |
|---|---|---|
| WO | 2016001227 A1 | 1/2016 |
| WO | 2016096770 A1 | 6/2016 |

OTHER PUBLICATIONS

Wu, G. et al., "A novel route to control refractive index of sol-gel derived nano-porous silica films used as broadband antireflective coatings", Materials Science and Engineering, B78 (2000) 135-139.
Wikipedia, "List of refractive indices", https://en.wikipedia.org/wiki/List_of_refractive_indices#List, Accessed Dec. 13, 2018.
Wacker Chemie AG, "Bright Ideas: Silicone Solutions for High-Performance LEDs", Germany, 2016.
"Teflon FEP—Fluoropolymer Film", The Chemours Company LLC, 2017.

* cited by examiner

LIGHT GUIDES WITH COATING TO BE USED IN WATER

CROSS-REFERENCE TO PRIOR APPLICATIONS

This application is the U.S. National Phase application under 35 U.S.C. § 371 of International Application No. PCT/EP2017/066103, filed on 29 Jun. 2017, which claims the benefit of European Patent Application No. 16176774.4, filed on 29 Jun. 2016 and European Patent Application No. 17178199.0, filed 27 Jun. 2017. These applications are hereby incorporated by reference herein.

FIELD OF THE INVENTION

The invention relates to a light guide element. The invention further relates to an anti-biofouling system comprising such light guide element. The invention also relates to an object that during use may at least partly be submerged in water, especially a vessel or an infrastructural object, which includes such anti-biofouling system. Further, the invention relates to a method for providing such anti-biofouling system to an object, especially a vessel or an infrastructural object. Yet further, the invention also provides a method of preventing and/or reducing biofouling at an external surface of an object.

BACKGROUND OF THE INVENTION

Anti-biofouling methods are known in the art. US2013/0048877, for instance, describes a system for anti-biofouling a protected surface, comprising an ultraviolet light source configured to generate ultraviolet light, and an optical medium disposed proximate to the protected surface and coupled to receive the ultraviolet light, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

US2013/048877 A1 describes a system including a UV light source and an optical medium coupled to receive UV light from the UV light source. The optical medium is configured to emit UV light proximate to a surface to be protected from biofouling.

US2004/022050 A1 describes that the index of refraction of a light guide for transmitting light outputted from a primary light source is ng, and the light guide has a light input end face, a light output surface from which the transmitted light is outputted, and a back surface opposed to the light output surface. A leaky ray modulator is provided to at least either the light output surface or the back surface. The leaky ray modulator has a composite layer provided on the light output surface or the back surface and composed of first refractive index regions having a refractive index n1 (ng>n1) and second refractive index regions having a refractive index n2 (n2>n1) and a third refractive index layer provided on the composite layer and having a refractive index n3 (n3>n1). A reflecting plate is provided adjacent to the back surface of the light guide.

WO2012/125271 A2 (D3) describes methods and compositions for forming porous low refractive index coatings on substrates. In one embodiment, a method of forming a porous coating on a substrate is provided. The method comprises coating a substrate with a sol-gel composition comprising at least one self-assembling molecular porogen and annealing the coated substrate to remove the at least one self-assembling molecular porogen to form the porous coating. Use of the self-assembling molecular porogens leads to the formation of stable pores with larger volume and an increased reduction in the refractive index of the coating. Further, the size and interconnectivity of the pores may be controlled via selection of the self-assembling molecular porogens structure, the total porogen fraction, polarity of the molecule and solvent, and other physiochemical properties of the gel phase.

WO2014/188347 A1 describes a method of anti-fouling of a surface while said surface is at least partially submersed in an liquid environment, comprising: providing an anti-fouling light; distributing at least part of the light through an optical medium comprising a silicone material and/or UV grade fused silica; emitting the anti-fouling light from the optical medium and from the surface.

U.S. Pat. No. 6,418,257 B1 describes a liquid light guide for transmitting UVC radiation formed of concentrically arranged Teflon light guide tube having an internal totally reflecting coat of a fluorolpolymer layer within a sheath having water or another aqueous solution disposed between the sheath and the light guide tube. The light guide tube contains an aqueous solution of $NaH_2PO_4$. Also disclosed is a method of making the device.

SUMMARY OF THE INVENTION

Biofouling or biological fouling (herein also indicated as "fouling" or "biofouling") is the accumulation of microorganisms, plants, algae, and/or animals on surfaces. The variety among biofouling organisms is highly diverse and extends far beyond attachment of barnacles and seaweeds. According to some estimates, over 1700 species comprising over 4000 organisms are responsible for biofouling. Biofouling is divided into microfouling which includes biofilm formation and bacterial adhesion, and macrofouling which is the attachment of larger organisms. Due to the distinct chemistry and biology that determine what prevents organisms from settling, these organisms are also classified as hard or soft fouling types. Calcareous (hard) fouling organisms include barnacles, encrusting bryozoans, mollusks, polychaete and other tube worms, and zebra mussels. Examples of non-calcareous (soft) fouling organisms are seaweed, hydroids, algae and biofilm "slime". Together, these organisms form a fouling community.

In several circumstances biofouling creates substantial problems. Machinery stops working, water inlets get clogged, and hulls of ships suffer from increased drag. Hence the topic of anti-fouling, i.e. the process of removing or preventing fouling from forming, is well known. In industrial processes, bio-dispersants can be used to control biofouling. In less controlled environments, organisms are killed or repelled with coatings using biocides, thermal treatments or pulses of energy. Non-toxic mechanical strategies that prevent organisms from attaching include choosing a material or coating with a slippery surface, or creation of nanoscale surface topologies similar to the skin of sharks and dolphins which only offer poor anchor points. Biofouling on the hull of ships causes a severe increase in drag, and thus increased fuel consumption. It is estimated that an increase of up to 40% in fuel consumption can be attributed to biofouling. As large oil tankers or container transport ships can consume up to €200.000 a day in fuel, substantial savings are possible with an effective method of anti-biofouling.

It surprisingly appears that one may effectively use UV radiation to substantially prevent biofouling on surfaces that are in contact with sea water or water in lakes, rivers, canals, etc. Herewith, an approach is presented based on optical methods, in particular using ultra-violet light or radiation (UV). It appears that most micro-organisms are killed, rendered inactive or unable to reproduce with sufficient UV light. This effect is mainly governed by the total dose of UV light. A typical dose to kill 90% of a certain micro-organism is 10 mW/h/m$^2$.

In the past, lighting modules for anti-fouling of a protected surface have been proposed comprising at least one light source for generating an anti-fouling light, an optical medium for distributing at least part of the anti-fouling light through the optical medium, the optical medium comprising an emission surface for emitting the distributed anti-fouling light in a direction away from the protected surface when the lighting module is arranged in, on and/or near the protected surface, and wherein the emission surface is a substantially planar surface. Especially, the optical medium comprises a silicone material, in particular a silicone material selected from the group comprising methyl-silicones, and/or UV grade silica material. A common problem with light guides is that too much light may escape at some parts, and too little may escape at other parts, which may lead to a sub-optimal distribution of the escaped light. For instance, depending on the position on the surface light needs to either get out, or e.g. closer to the LED the light needs to be kept in the (silicone) layer which functions as a light guide. The latter can be done in several ways. For instance, collimation by applying small reflectors or lenses close to the LEDs may be used. However, this may include additional optical elements, which may make the module more expensive and may make the production process more complex. Further, the dimensions of the module may also substantially increase.

Further, light guides may deteriorate upon contact with chemicals or may not have enough strength when provided as relatively thin (but UV transparent) layer.

Hence, it is an aspect of the invention to provide an alternative system or method for prevention or reduction of biofouling, which preferably further at least partly obviates one or more of above-described drawbacks.

Herein, a solution is proposed which may in embodiments be based on changing the material at the outside of the light guide, such as a silicone light guide. The light guide is provided with one or more layers at one side and/or one or more layers at the other side of the light guide, to provide and/or improve properties like (i) control of UV radiation that escapes from the light guide, (ii) control of the side where the UV radiation escapes from the light guide, (iii) strength, (iv) chemical stability, (v) life time, (vi) adhesiveness, etcetera.

Hence, in a first aspect the invention provides a light guide element ("element") comprising a light guide, wherein the light guide comprises a first light guide face and a second light guide face with UV radiation transmissive light guide material between the first light guide face and the second light guide face, wherein the light guide element further comprises one or more of: (i) a first layer element (may also be indicated as "first stack" or "first layer stack") in contact with the first light guide face, wherein the first layer element is transmissive for UV radiation; and (ii) a second layer element (may also be indicated as "second stack" or "second layer stack") in contact with the second light guide face, wherein the second layer element in specific embodiments has one or more functionalities selected from the group consisting of (a) reflective for UV radiation, (b) adhesive for adhering the light guide to an object, (c) reinforcing the light guide element, and (d) protective for the light guide.

With such light guide element, it may be possible to essentially block molecules entering the light guide. Such molecules, like organic molecules, may (over time) lead to a reduction of the UV transmissiveness of the light guide. Further, with such light guide element it is possible to (better) spread the UV radiation over the light guide, as at the outcoupling side, part of the light will be reflected due to total internal reflection, leading to a further spreading of the UV radiation over the light guide. Further, with such light guide it may be possible to increase the transmissiveness of the light guide, which in embodiments may imply using a mechanically weaker but UV more transparent silicone. With a layer element, mechanical strength may then be retained or even improved. Also the thickness of the light guide may be reduced. Further, with such light guide UV radiation that escapes at an undesired side may be reflected back into the light guide (for instance UV radiation that may escape at the second light guide face). Yet further, with such light guide it is possible to provide an adhesive layer. For instance, a silicone light guide may lead to difficulties when adhering to an object. However, when an addition layer is provided that binds well with the light guide and has adhesive properties, this problem is solved. Note that one or more layers may have one or more functionalities. For instance, an adhesive layer may also provide (total internal) reflective properties to the light guide.

As indicated above, the light guide element comprises a light guide. The light guide comprises a first light guide face and a second light guide face, and may especially have a plate-like shape. Further, the light guide comprises UV radiation transmissive light guide material between the first light guide face and the second light guide face. Hence, the UV radiation transmissive light guide material may especially be configured as plate, having the first light guide surface and (opposite thereof) the second light guide surface. Hence, the light guide may essentially consist of UV radiation transmissive material. More details about the light guide are provided below.

The light guide element further comprises one or more of a first layer element and a second layer element. Each layer element may comprise one or more layers. In embodiments, the number of layers may be chosen independent of each other. The light guide element may comprise one or both layer elements. In embodiments, the light guide element comprises the first layer element. In embodiments the light guide element comprises the second layer element. Especially, the light guide element may comprise both the first layer element and the second layer element. Then, an especially useful combination of features may be obtained, such as strength, optical properties, adhesion, barrier function, etc.

The layers which are described herein may be continuous layers or may be patterned layers. Further, a combination of one or more continuous layers and one or more patterned layers may be applied. Especially, the layers are continuous layers.

The first layer element is in contact with the first light guide face. Further, the first layer element is transmissive for UV radiation. By definition, especially at least part of the UV radiation that is provided in the light guide escapes via the first light guide face. Hence, the first layer element is configured to transmit at least part of the UV radiation.

The second layer element is in contact with the second light guide face. Especially, the second layer element has one or more functionalities selected from the group consisting of (a) reflective for UV radiation, (b) adhesive (for adhering the light guide to an object), (c) reinforcing the light guide element, and (d) protective for the light guide. However, other functionalities are not excluded.

In view of optical properties, it surprisingly appears that a limited number of materials are especially relevant as top coating or otherwise as layer comprised by the first layer element. Especially, silicone materials may be useful. Alternatively or additionally, fluoropolymers seem useful. Such materials may have a relative good transmission for UV radiation, may have the right indices of refraction, and may be used as coating on e.g. a silicone light guide. Therefore, in embodiments the light guide element at least comprises the first layer element, wherein the first layer element comprises a first layer comprising one or more of (a) a silicone and (b) a fluoropolymer, wherein the first layer and the light guide have a different composition. Hence, the light guide may comprise silicone and the first layer may comprise silicone. However, their compositions will be different. Especially the latter may comprise a higher content of networks or network generating molecules, with organic side-groups that can cross link. The difference with silicone molecules in the light guide is that they contain much less organic side groups, at the same time providing more UV transparency and less mechanical strength.

In specific embodiments, the first layer comprises one or more of fluorinated ethylene, fluorinated propylene, fluorinated ethylene propylene, fluorinated propylene acetate, etcetera. In other embodiments, the first layer may comprise polyethylene terephthalate. Note that the term "first layer" and similar terms may in embodiments also refer to a plurality of layers. Further, the first layer may also comprise a blend of different polymers. In yet further embodiments, also copolymers of different polymers may be used.

Alternatively or additionally, the light guide may comprise a silicone.

Especially, the first layer may (also) comprise a silicone having a larger mechanical strength than the light guide (which may thus essentially consist of a silicone, like for instance Lumisil L400). For instance, both the light guide and the first layer may comprise a silicone. However, the UV transmission of the light guide may be higher, whereas the UV transmission of the silicone layer may be lower (than of the light guide).

The first layer element will at least transmit at least part of the UV radiation. However, the first layer element may also reflect part of the UV radiation. Amongst others, this may be obtained with a UV radiation transmissive layer having an index of refraction (in the UV) smaller than the index of refraction of the material of the light guide (see further also below).

Alternatively or additionally, the first layer element may comprise one or more layers that block penetration of molecules in the light guide. As there may be a (small) diffusion of molecules form the outside in the light guide, this may lead to a reduction of UV transmissiveness, as in general such molecules, like (UV-absorbing) organic molecules may lead to degradation products and/or may weaken the structure of the light guide material. Therefore, in embodiments the first layer element is configured to impede ingress of organic molecules into the light guide. Hence, the first layer element may have a protective function.

Alternatively or additionally, the first layer element may be configured to impede ingress of inorganic molecules. Yet further, alternatively or additionally, the first layer element may be configured to impede ingress of ions. In embodiments, the term "ion" may also refer to a charged organic molecule (by way of example a charged organic molecule is e.g. acetate) or an inorganic molecule (by way of example, a charged inorganic molecule is silicate).

Especially, the species to be block is a species that absorbs UV-C light, like a UV-light absorbing (organic) molecule. Especially, the organic molecules to be blocked typically, but not exclusively, contain at least one double bond, be it an ester, carbonyl, vinyl, alkyne, urethane etc. These molecules can both be generated by organisms in the sea, as well as be present in the sea due to outside influences (oil spills and other industrial activities).

Alternatively or additionally, the first layer element may be applied for preventing ingress of water in the light guide and/or in a layer of the first light guide element, for instance in case a sol-gel optical layer is applied (see also below).

In specific embodiments, the first layer element comprises a layer stack comprising an optical layer (as defined in more detail elsewhere herein) and further comprising a second layer in contact with at least part of said optical layer, wherein the second layer is water impermeable and/or is essentially impermeable to organic molecule. Further, such the second layer (also) comprises a UV radiation transmissive layer material.

Further, alternatively or additionally, the first layer element may provide strength to the light guide element. As the light guide may be relatively thin and may also be relatively weak, it may be desirable to provide a reinforcing layer (at the side of the first light guide face and/or at the side of the second light guide face). Therefore, in embodiments the first layer element has one or more of (i) a larger compression strength, (ii) a larger tangent Modulus (Young's modulus), and (iii) a larger toughness than the light guide. For instance, this can be at least 5%, such as at least 10%, like at least 20% larger. In this way, the light guide element may have an increased strength.

Hence, in specific embodiments the first layer element has one or more functionalities selected from the group consisting of (a) partly reflective for UV radiation, (b) reinforcing the light guide element, and (c) protective for the light guide. Such one or more functionalities may be provided with one or more layers.

Especially good results were obtained with fluoropolymers. Layers comprising such polymers may be used as layer of the first layer element and/or as second layer element. Therefore, in embodiments one or more of the first layer element and the second layer element comprise a layer comprising one or more of fluorinated ethylene, fluorinated propylene, fluorinated ethylene propylene, fluorinated propylene acetate, etc.

In a specific embodiment, the light guide element comprises a light guide element ("element") comprising a light guide and a first layer element, wherein the light guide (herein also indicated as "optical medium") comprises a first light guide face and wherein the first layer element comprises an optical layer, wherein said optical layer is in contact with at least part of the first light guide face, wherein the optical layer has a first index of refraction (n1) (index of refraction is herein also indicated as "refractive index"), which is in specific embodiments smaller than 1.36 at 280 nm, wherein the light guide comprises a UV radiation transmissive light guide material ("light guide material"). In a further aspect, the invention provides a light guide element comprising a light guide and a first layer element, wherein the light guide comprises a first light guide face and wherein the first layer element comprises an optical layer, wherein said optical layer is in contact with at least part of the first light guide face, wherein the optical layer has a first index of refraction (n1) smaller, especially at least 2% smaller, than the index of refraction of water at 25° C. (and atmospheric pressure), wherein the light guide comprises a UV radiation transmissive light guide material. The optical layer comprises an optical layer material which may be UV radiation transmissive.

With such light guide coupling out of radiation within the light guide may be reduced due to the first layer element on the light guide (face). Further, by providing the first layer element e.g. close to the light source and not providing the first layer element further away from the light source, the coupling out of the radiation may be tuned and the outcoupled light may be distributed (more) homogenously over the light guide element. Such light guide may especially be used in combination with a source of UV radiation to provide anti-biofouling light (which may also be indicated as anti-biofouling radiation). Such light, more precisely such radiation, includes especially UV radiation. With the invention, the distribution of the (outcoupled) radiation may be better controlled.

Hence, in specific embodiments the first layer element comprises an optical layer, wherein said optical layer is in contact with at least part of the first light guide face, wherein the optical layer comprises optical layer material. Especially, the optical layer has a first index of refraction (n1) smaller than 1.36 at 280 nm. Alternatively or additionally, the optical layer is a porous optical layer having a porosity in the range of 5-70%. Porosity may be measured with methods known in the art, such as based on the specific weight or with porosimetry, etc. In specific embodiments, the optical layer material comprises a sol-gel material. Further details can also be found below.

Alternatively or additionally, the light guide element may comprise the second layer element. As indicated above, the second layer element may provide one or more functionalities, such as especially selected from the group consisting of (a) reflective for UV radiation, (b) adhesive for adhering the light guide to an object, (c) reinforcing the light guide element, and (d) protective for the light guide. Other or additional functionalities may also be possible.

The reflectiveness for UV radiation may be provided by a reflective layer that is based on e.g. an aluminum coating. Alternatively or additionally, the reflectiveness for UV radiation may be provided by a layer that imposed total internal reflection on the light guide. For instance, a layer having a smaller index of refraction at the second light guide face may force a part of the light back into the light guide due to total internal reflection in the light guide. Hence, when using total internal reflection, the index of refraction of the layer at the second light guide face may essentially be smaller than the index of refraction of the light guide material. For instance, the index of refraction of the material of an (optical) layer comprised by the second layer element, especially such layer being in physical contact with the second light guide face, is at least 0.02, such as at least 0.04 smaller than the index of refraction of the light guide (material).

Further, the second layer element may especially be used for providing adhesiveness for the light guide element. As e.g. silicone light guides may not easily adhere to objects, such as a hull of a vessel, an adhesive layer may be provided. Hence, in specific embodiments the second layer element comprises one or more second layer element layers having one or more functionalities selected from the group consisting of (a) reflective for UV radiation, and (b) adhesive for adhering the light guide to an object. In embodiments, the second layer element may comprise a first reflective layer configured in contact with the second light guide face, and a first adhesive layer configured as outer layer of the second layer element.

Further, a single layer may provide more than one functionality. This may apply for both the first layer element and the second layer element.

For instance, in specific embodiments the invention also provides an adhesive layer, especially such layer being in physical contact with the second light guide face, which comprises material that is in principle transmissive for UV radiation, but which has a smaller index of refraction than the light guide material, especially at least 0.02, such as at least 0.04 smaller than the index of refraction of the light guide (material).

Therefore, in specific embodiments the light guide element comprises both the first layer element and the second layer element, wherein both layer elements comprise a layer having an index of refraction lower than the light guide.

Ultraviolet (UV) is that part of electromagnetic light bounded by the lower wavelength extreme of the visible spectrum and the X-ray radiation band. The spectral range of UV light is, by definition between about 100 and 400 nm (1 nm=$10^{-9}$ m) and is invisible to human eyes. Using the CIE classification the UV spectrum is subdivided into three bands: UVA (long-wave) from 315 to 400 nm; UVB (medium-wave) from 280 to 315 nm; and UVC (short-wave) from 100 to 280 nm. In reality many photobiologists often speak of skin effects resulting from UV exposure as the weighted effect of wavelength above and below 320 nm, hence offering an alternative definition. The terms "visible", "visible light" or "visible emission" refer to light having a wavelength in the range of about 380-780 nm.

A strong germicidal effect is provided by the light in the short-wave UVC band. In addition, erythema (reddening of the skin) and conjunctivitis (inflammation of the mucous membranes of the eye) can also be caused by this form of light. Because of this, when germicidal UV-light lamps are used, it is important to design systems to exclude UVC leakage and so avoid these effects. In case of immersed light sources, absorption of UV light by water may be strong enough that UVC leaking is no problem for humans above the liquid surface. Hence, in an embodiment the UV radiation (anti-fouling light) comprises UVC light. In yet another embodiment, the UV radation comprises radiation selected from a wavelength range of 100-300 nm, especially 200-300 nm, such as 230-300 nm. Hence, the UV radation may especially be selected from UVC and other UV radiation up to a wavelength of about 300 nm. Good results are obtained with wavelengths within the range of 100-300 nm, such as 200-300 nm.

The light guide may especially be a dielectric material with high permittivity for light, and in general a high index of refraction. As further also described below, the light guide may e.g. include silicone or fused silica, but also other materials may be applied. In embodiments, the light guide comprises a silicone material, in particular a silicone material selected from the group comprising methyl-silicones, and/or UV grade silica material. Especially, materials are applied and dimensions may be applied that allow UV radiation be transmitted through the light guide. Therefore, in embodiments the light guide comprises a UV radiation transmissive light guide material, such as silicone, (fused)

silica, quartz, etc. However, also another (solid) material or combination of (solid) materials may be applied having a UV transmission in the range of those of one or more of silicone, (fused) silica, quartz. For instance, a light guide material having a UV transmission of at least 50% of quartz may also be applied. Hence, the light guide may especially be transparent. Hence, in embodiments the light source may be embedded in the waveguide, such as a silicone waveguide. The waveguide especially comprises a radiation transmissive material, such as glass, quartz, (fused) silica, silicone, fluoropolymer etc.

The light guide may especially have a plate-like shape. The plate-like shape may in embodiments be curved in one or two directions, or may be curvable in one or two directions, such as may be the case with silicones. Especially, the light guide has a height substantially smaller than a length or a width, such as at least 5 smaller, even more especially at least 10 times smaller. At least one of the faces (of the two faces defining the height of the light guide), or at least part of such first light guide face, may be used as light outcoupling face. This face is herein also indicated as first light guide face. UV radiation may escape from this face. Some escape is desired in view of the anti-biofouling function of the radiation, but too much radiation may escape or escape at the wrong parts of the first light guide face.

To this end, the invention provides in embodiments an optical layer which is in contact with at least part of the first light guide face. This optical layer has an index of refraction smaller than water, especially for UV radiation used by a light source used in combination with the light guide (see further also below). The optical layer is in optical and/or physical contact with at least part of the light guide. Especially, the optical layer is in physical contact with at least part of the first light guide face.

In embodiments, the index of refraction of the optical layer is at least 2% smaller, such as at least 5% smaller, than the index of refraction of seawater. In embodiments the optical layer has a first index of refraction (n1) smaller than 1.36 at 280 nm. At 280 nm the index of refraction of water, including seawater is equal to or higher than 1.36. Hence, the index of refraction of the optical layer should be smaller than this value, such as at least with the above indicated 5%. Therefore, in more specific embodiments the first index of refraction (n1) is equal to or smaller than 1.35 at 280 nm, such as equal to or smaller than 1.34 at 280 nm, like equal to or smaller than 1.30 at 280 nm, such as especially equal to or smaller than 1.25 at 280 nm, like equal to or smaller than about 1.22 at 280 nm. Especially, the first index of refraction of the optical layer may be at least about 1 (at 280 nm), such as at least about 1.10 (at 280 nm), like at least about 1.15 (at 280 nm). In specific embodiments, the index of refraction of the optical layer is at least 0.02, such as at least 0.04 smaller than the index of refraction of the light guide (material).

The choice for the definition of the index of refraction at 280 nm does not mean that the light source used for providing anti-biofouling light necessarily provides radiation at 280 nm, or provides such radiation having a dominant wavelength at 280 nm. This wavelength is only chosen for the sake of definition. For instance, when 200 nm or 300 nm would be used, the index of refraction at those wavelengths of the optical layer is especially smaller than 1.39 or 1.35, respectively.

The index of refraction herein used is especially measured at atmospheric pressure and 25° C. For water reference values, it is referred to George M. Hale et al., Applied Optics, 1973, Vol. 12, No. 3, p. 555-563, which is herein incorporated by reference.

Especially, the optical layer has a first index of refraction (n1) smaller, especially at least 2% smaller, such as at least 5% smaller, than the index of refraction of water at 25° C. (and atmospheric pressure), such as in the range of about 80-98% of the index of refraction of water at 25° C. (and atmospheric pressure), like in the range of about 85-95%. The index or indices of refraction of water herein indicated may especially be related to demineralized water. Of course, this does certainly not apply that the invention is to be applied in demineralized water. Only the index of refraction of the optical layer may be defined in relation to demineralized water, such as the index of refraction of the optical layer being at least 2% lower than the index of refraction of (demineralized) water (at 25° C. and at atmospheric pressure). The index of refraction of the optical layer and of water are (thus) especially evaluated under substantially identical conditions (such as 25° C. and atmospheric pressure). For water, reference values may be used as e.g. defined by Hale et al. (see above).

The above-indicated values for the refractive index of the optical layer may imply that the optical layer material has such index of refraction. However, as will be elucidated below when introducing porosity in the optical layer, the optical layer material may also have a (slightly) larger refractive index. The optical layer as such has the index of refraction lower than water and/or an index of refraction lower than 1.36 at 280 nm.

The chemical composition of the UV radiation transmissive optical layer material and/or the morphology of the optical layer are especially different from the chemical composition of the light guide material and/or the morphology of the light guide. Hence, especially there is a (clear) interface between the light guide and the optical layer.

Especially, the optical layer is transmissive for UV radiation. Therefore, especially the material of the optical layer is transmissive for UV radiation. Hence, this material is herein also indicated as UV radiation transmissive optical layer material. For instance, by the layer height of the optical layer the outcoupling of UV radiation from the light source (see also below) can be controlled. Herein, "transmissive" may e.g. indicate that at least 5% of the UV radiation of the light source (that escapes from the light guide) is transmitted through the optical layer, especially at least 10%, such as even more especially at least 20%, such as at least 40%, like in the range of 40-95%, or even higher. Note that this transmission thus applies to radiation that is not kept in the light guide, e.g. due to the angle of incidence. Here, the value of the transmission especially refers to radiation propagating perpendicular to layer thickness. The transmission or light permeability can be determined by providing light at a specific wavelength with a first intensity to the material and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989). In specific embodiments, the transmission for one or more wavelengths in the UV is at least 1%, such as at least 2%, like at least 5%, such as at least 10%, over the length of the light guide.

In specific embodiments, a material may be considered UV transmissive when the transmission of UV radiation at a wavelength in the UV, especially at a wavelength or in a wavelength range of radiation generated by a source of radiation as herein described, such as 280 nm, or UVB and/or UVC radiation, through a 1 mm thick layer of the material (such as silicone or water), especially even through a 5 mm thick layer of the material, under perpendicular irradiation with said UV radiation is at least about 80%, such as at least about 85%, such as even at least about 90%. Hence, in embodiments the transmission for UV radiation, especially 280 nm, is at least 80%/mm, even more especially at least 80%/5 mm.

The optical layer may especially be used to extend the angles of incidence at which light is kept in the light guide. Note that e.g. a light guide made of silicone, but without optical layer, when being submerged in water may show some TIR, though substantially only at very shallow angles (since the difference of refractive index between water and silicones is so small). Adding the optical layer on top of the silicone (or other material) with a refractive index lower than water will increase the 'range of angles' that will actually reflect according to TIR. Hence, more light will stay inside the light guide.

The optical layer may be configured over the entire first light guide face but may in other embodiments also be available on only part of the first light guide face. Further, the optical layer may be provided with different thicknesses on different parts of the first light guide face. In this way the positions(s) where (more) UV radiation has to be reflected back into the light guide can be obtained by providing the layer and the position(s) where (less) UV radiation has to be reflected back into the light guide can be obtained by providing no layer. In this way, but also in other ways, a patterned layer may be provided, especially for promoting an evenly distribution of the light source light escaping from the first light guide face. Therefore, in embodiments the optical layer is a patterned optical layer with one or more first regions comprising said optical layer material with a first layer thickness ($h1$) and one or more second regions comprising said optical layer material with a second layer thickness ($h2$) in the range of $0 \leq h2 < h1$. With $h2=0$, there is no optical layer. The thickness of the first layer is especially at least 100 nm, even more especially at least 200 nm, yet even more especially at least 300 nm, such as at least 400 nm, like in the range of 400 nm-20 µm, like 1-15 µm, like 2-10 µm. However, thicker layers may also be possible, such as even up to about 2 mm, like up to about 1 mm (and especially at least 200 nm, such as at least 300 nm). With such thickness, UV radiation may be transmitted through the optical layer, especially when one or more of the herein mentioned materials are used. Hence, the optical layer may be chosen such, that the herein indicated transmission may be obtained. This is known to a person skilled in the art.

As indicated above, the optical layer material may especially have a low index of refraction, such as lower than water.

The optical layer may include pores. The term "pore" may also refer to "cavity". Such pores may contain a gas, such as a noble gas, $CO_2$, or air. By such porous structure, the refractive index of the optical layer may also be relatively low.

Especially, the pores are pores that enclose the gas. For instance, during production of the optical layer, gas may be captured in the layer, thereby providing an optical layer with a kind of porous structure, though such pores may not be accessible from external.

Alternatively or additionally, in embodiments the pores may be accessible from external, but this access has substantially been blocked with a layer, such as a water resistant layer or a water impermeable layer.

Alternatively or additionally, the pores may be accessible from external by a gas, but the pores may have such dimensions, optionally in combination with a water repellent material in the pores (or of the porous material), that water does not substantially accesses the pores.

In embodiments, the optical layer is a porous optical layer having a porosity in the range of 5-70%, such as 10-50%. The porosity may e.g. be determined by using the volume of the layer, the volumetric mass density known for the optical layer material, and the weight of the layer. Based thereon, the porosity can be determined, as the occupied volume is larger than the theoretical volume based on weight and assuming no porosity. In specific embodiments, the dimensions of the pores are smaller than about 300 nm, such as smaller than about 200 nm. In specific embodiments, the dimensions may be smaller than the dominant wavelength of the radiation of the light source which may be used in combination with the light guide element.

In embodiments, the optical layer material comprises a sol-gel material. Methods for making sol-gel layers or porous layers are known in the art, and are e.g. described in WO2012/125271, US2011/0111203, U.S. Pat. No. 4,271,210, Guangming Wu et al., Materials Science Engineering B78, 135-139, which are herein incorporated by reference.

Hence, in embodiments the low refractive material is a micro-porous material. The material may in embodiments be produced through sol-gel routes from e.g. MTMS/TEOS (methyl trimethoxy silane/tetra ethoxy silane)), where the micro-porosity may be achieved by using a soap (e.g. polyethyleneoxide). Micro pores in the sol gel have dimensions smaller that the wavelengths of the UV light and that prevents high losses due to scattering. The low refractive materials can be applied as a thin layer. Such a low refractive layer increases the angle of total reflection, and thereby reduce the out coupling. The optical layer may in embodiments comprise one or more of an aluminate and a silicate.

The term "optical layer" may also refer to a plurality of (different) optical layers configured as stack and providing an optical layer stack (which may herein also be indicated as "first optical layer stack" or "first layer stack" or "stack" or "first stack"). Such optical layer stack is herein simply indicated as "optical layer". Hence, in embodiments the first layer element may include a single layer or a plurality of layers that are stacked.

In yet further embodiments, the first layer element may include the optical layer and one or more other layers, such as a water impermeable layer or a water repellent layer. Therefore, in embodiments the first layer element comprises a layer stack comprising said optical layer and further comprising a second layer in contact with at least part of said optical layer, wherein the second layer may in embodiments be water impermeable (or water repellent). In analogy, the second layer comprises a UV radiation transmissive optical layer material. Hence, material and thickness may be chosen such that UV radiation is transmitted. Another term for a water repellent layer is a hydrophobic layer. Water repellent material may e.g. include poly tetrafluoro ethylene.

Alternatively or additionally, the second layer may be configured as protective layer. For instance, the second layer may have a higher strength in one or more respects than the optical layer. For instance, the combination of the optical layer and second layer may have one or more of a larger compression strength, a larger tangent Modulus (Young's modulus), a larger toughness, a larger Vicker's hardness, etc., than the optical layer alone.

Alternatively or additionally, the second layer may provide a higher strain point and/or a higher anneal point.

Further, the second layer may provide a more flat surface. For instance, the second layer may provide a flat surface with a surface roughness Ra equal to or smaller than 10 nm, such as equal to or smaller than 5 nm, like equal to or smaller than 2 nm. This may e.g. be of interest in embodiments wherein the optical layer is patterned. The term "second layer" may also refer to a plurality of layers. Essentially, each of the second layers are transmissive for UV radiation.

Therefore, in embodiments the entire first layer stack is transmissive for UV radiation. For instance, the transmission for UV radiation, especially 280 nm, is at least 80%/mm, even more especially at least 80%/5 mm.

In yet further embodiments, at another side of the light guide (also) a layer, herein indicated as third layer, may be provided. Therefore, in embodiments the light guide element further comprises a third layer in contact with at least part of the second light guide face.

A distance (h3) between the first light guide face and the second light guide face defines a thickness of the light guide. This thickness may be constant or may vary. In general, the thickness will essentially be constant over the light guide. The third layer may in embodiments be configured as one or more of adhesive layer and reflective layer. As adhesive layer, the third layer may be used to attach to a surface to which the light guide element may be configured. For instance, silicone may not be adhesive enough. Hence, the third layer may be used to adhere to an object. Alternatively or additionally, the third layer may be used as reflective layer. In this way, light may be kept in the light guide. In embodiments, when the third layer is UV radiation transmissive, the index of refraction of the third layer is smaller than the index of refraction of the light guide (material). In embodiments, the third layer may be a sol-gel layer. In (very) specific embodiments, the third layer and the second layer comprise the same material.

In embodiments, the term "third layer" may also refer to a plurality of layers. Therefore, in embodiments, the light guide element may further comprise a second layer stack, configured at the second light guide face, and comprising one or more layers, with at least one layer in contact with at least part of the second light guide face. In embodiments, a first layer in the second stack, being in contact with the second light guide face is reflective for UV radiation, and another layer in the second stack, which is configured as outer layer of the stack, most remote of the second light guide face, is an adhesive layer.

Above some possible materials for the optical layer are described. In yet further embodiments, the light guide uses water as light guide material. The material enclosing the water may be as defined above (as it should also be transmissive for UV radiation and/or have light guiding properties). For instance, a closed plate filled with water or another liquid, such as one or more of methanol, ethanol, and diethyl ether, may be applied. However, also another liquid or combination of liquids may be applied having a UV transmission in the range of those of one or more of water, methanol, ethanol and diethyl ether. For instance, a light guide material having a UV transmission of at least 50% of water may also be applied. In other embodiments, closed channels may be applied. Further, optionally the water may be flown through the light guide. This may be beneficial for keeping the internal surfaces clean and/or for cooling purposes. Further, optionally turbulence may be introduced as means to control outcoupling of the light source light, with low turbulence inducing less outcoupling and with more turbulence inducing more outcoupling. Therefore, in embodiments the light guide comprises a closed cavity filled with a UV radiation transmissive fluid, especially a liquid. The water may especially be fresh water, even more especially demineralized water. Hence, in specific embodiments, the light guide comprises a first material comprising silicone, wherein the first material defines the cavity, and wherein the UV radiation transmissive liquid comprises water. Hence, water may be used as optical medium (or light guide medium).

As indicated above, the light guide in combination with a light source may especially be used to provide anti-biofouling light to surfaces that foul, such as ship hulls. Even more especially, as will also be further elucidated below, the light guide element may be used as a skin on an object, such as a vessel. Whereas the external face ("fouling surface") of the object, such as a ship hull, may be subject to biofouling, when the light guide element is used as skin on such object, the fouling surface is translated to the first light guide face (including additional layer) provided by the light guide element provides. Hence, for at least part of the object, the light guide element may become its outer surface (and thus potentially be subject to fouling).

Therefore, in yet a further aspect the invention also provides an anti-biofouling system ("system") comprising the light guide element as described herein and a light source, wherein the light source is configured to provide said UV radiation into the light guide, and wherein the anti-biofouling system is configured to provide at least part of said UV radiation downstream from the first light guide face (and optionally downstream from the optical layer). Hence, the UV radiation is coupled out from the light guide through at least part of the first light guide face, and is thus provided downstream from the first light guide face (and optionally downstream from the optical layer). Especially, the invention provides an anti-biofouling system comprising the light guide element as described herein and a light source, wherein the anti-biofouling system comprises a radiation exit window comprising said first light guide face, wherein the light source is configured to provide said UV radiation into the light guide, and wherein the radiation exit window is configured to transmit at least part of said UV radiation. The radiation exit window may thus in embodiments also comprise the first layer element.

Specific embodiments in relation to the light guide element are also defined above, but below a few are—for the sake of completeness—reiterated.

In specific embodiments, the light source comprises a light emitting face, wherein the light emitting face is configured within the light guide. For instance, solid state light sources may be embedded in the light guide. Essentially, the entire solid state light source may be embedded in the light guide (material).

As indicated above, a distance (h3) between the first light guide face and the second light guide face defines a thickness of the light guide. Especially, the thickness (h3) is at maximum 5 mm, such as in the range of 0.5-2.5 mm, like 1-2 mm.

As indicated above, the light guide element may comprise one or more of the first layer element and the second layer element, especially both layer elements. Further, as indicated above, one or more of the first layer element and the second layer element comprise a layer comprising one or more of fluorinated ethylene, fluorinated propylene, fluorinated ethylene propylene, fluorinated propylene acetate, etc. Further, in embodiments the first layer element has one or more of a larger compression strength, a larger tangent Modulus, and a larger toughness than the light guide.

Compression strength, tangent Modulus, and toughness may be measured with methods known in the art.

In embodiments, the system further comprises a pump configured to flow a liquid through the light guide (when a liquid based light guide is used; see also above).

The light source especially comprises a solid state light source, such as a LED. The combination of light guide and light source are herein also indicated as UV-emitting element.

In embodiments, the light source is configured external from the light guide. In such embodiments, the light source is configured to provide the light source light to a face of the light guide, whereby light of the light source is coupled into the light guide (such as via an edge face of the light guide). The light source and the light guide are especially radiationally coupled. The term "radiationally coupled" especially means that the light source and the light guide are associated with each other so that at least part of the radiation emitted by the light source is received by the light guide (and at least partly escapes from the light guide).

In yet other embodiments, the light source comprises a light emitting face, wherein the light emitting face is configured within the light guide. For instance, a LED may be embedded in silicone. Examples of the latter embodiment are e.g. described in WO2014/188347 which is herein incorporated by reference. Of course, different embodiments may be combined.

Specific embodiments described in relation to the light guide may thus also apply in relation to the light guide comprised by the anti-biofouling system. Hence, in specific embodiments the optical layer is a patterned optical layer with one or more first regions comprising said optical layer material with a first layer thickness (h1) and one or more second regions comprising said optical layer material with a second layer thickness (h2) in the range of $0 \leq h2 < h1$, with especially h2=0 (in fact no optical layer in those second regions), wherein the patterned optical layer is configured to provide an even distribution of the UV radiation downstream from said radiation exit window. In embodiments, there may be a plurality of first regions and a plurality of second regions. These regions may in embodiments be regularly arranged.

In yet further embodiments, the light guide comprises a closed cavity filled with a UV radiation transmissive liquid, wherein the light guide comprises a first material comprising silicone, wherein the first material defines the cavity, wherein the UV radiation transmissive liquid comprises water, and wherein the first index of refraction (n1) is equal to or smaller than 1.25 at 280 nm (see further also above).

The optical layer may assist in distributing the light source light over the light guide. Additionally, also optical structures may be applied that may be comprised by the light guide, such as optical structures entirely enclosed by the light guide and/or optical structures in or on the face(s) of the light guide, such as the first light guide face or a face opposite of the first light guide face. Therefore, in embodiments the light guide further comprises optical structures configured to provide an even distribution of the UV radiation downstream from said radiation exit window.

A face (of the light guide, configured) opposite of the first light guide face may e.g. comprise a reflective material, such as reflective coating. Further, especially one or more of the faces defining the height, i.e. one or more edges, may be lit by the light source(s). Hence, especially edge lighting is applied. Would there be one or more face(s) not be lit by the light source(s), such one or more face(s) may comprise a reflective material, such as a reflective coating.

The combination of light guide and light source may herein also be indicated as UV-emitting element. Further, the first light guide face may also be indicated as radiation exit window. In embodiments, the radiation exit window may comprise the first light guide face.

As indicated above, the anti-biofouling system comprises a UV-emitting element. The term "UV-emitting element" may also refer to a plurality of UV-emitting elements. Hence, the system may include a plurality of such elements. The system may include a source of electrical energy, but the system may (during use) also be functionally coupled with a source of electrical energy. In embodiments, each UV-emitting element may functionally be coupled with a source of energy. This allows a decentral powering of the UV-emitting elements. The source of energy is especially used for powering the light source(s).

Herein, the UV-emitting element can also be indicated as "lighting module". The UV-emitting element may be a plate-like module (herein also indicated as "optical medium" or "light guide"), with one or more relevant elements at least partly, or even entirely, embedded therein. Hence, in embodiments the UV-emitting element comprises light transmissive (solid) material, such as silicone, etc. However, the UV element may also include a housing enclosing at least partly, or even entirely, one or more relevant elements. The one or more relevant elements at least comprise the light source, which is configured to provide light source light, especially the UV radiation. The UV-emitting element may have a flat or a curved radiation exit window. The term "UV-emitting element" indicates that the element is especially configured to provide UV radiation during use of the element.

The UV-emitting element comprises a UV radiation exit window. The UV radiation exit window is configured to transmit at least part of the UV radiation of the light source. Hence, the exit window is transmissive for UV radiation. In general, the window will also be transmissive for visible light. As indicated above, and as will further be explained below, in embodiments the element may be a radiation transmissive plate. In such instance, the window may be a face (or plane) of the element. In yet other embodiment, the element comprises a housing, which housing comprises such window. In such embodiments, the radiation exit window (also) comprises light transmissive (solid) material, such as silicone, etc. The term "radiation transmissive" refers to transmissive for radiation, especially for UV radiation and optionally also for visible radiation.

The UV radiation exit window comprises an upstream window side and a downstream window side. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream". Hence, the upstream window side ("upstream side") is especially directed to the internal of the element and may receive, directly, or after internal reflection, light source light. The downstream window side ("downstream side") may especially be directed to the external of the element. This window side may e.g. (temporarily) be in contact with water during use of the system. Note that in plate-like embodiments of the element the upstream window side and a downstream window side may be both sides of the (same) edge (or plane). In embodiments where a housing is applied, the window may have a non-zero thickness between the upstream window side and a downstream window side. The downstream window side may comprise the optical layer. Especially, the optical layer is configured on the downstream window side.

In embodiments, the system may be based on the principle of TIR (Total Internal Reflection). The light source (configured internal or external of the light guide) may be configured to provide the UV radiation (and/or other type of radiation; see below) to the radiation exit window based on the principle of total internal reflection.

The element at least comprises a light source for UV radiation. This UV radiation is used for anti-biofouling. Hence, the UV radiation is used as anti-biofouling radiation. Herein, the term "light" in light source and similar terms may thus also refer to UV radiation.

As indicated above, in a further aspect the invention provides an object comprising an external surface and the anti-biofouling system, as defined herein, associated to the external surface. Especially, in an aspect the invention provides an object that during use is at least partly submerged in water, the object comprising the anti-biofouling system as defined herein, wherein the UV-emitting element is configured to irradiate with UV radiation during an irradiation stage one or more of (i) a part of an external surface of said object and (ii) water adjacent to said part of said external surface. As indicated herein, the object may especially be selected from the group consisting of a vessel and an infrastructural object, but also other objects. The phrase "during use is at least partly submerged in water may refer to fresh water or sea water or a mixture thereof (brackish water). Hence, the invention may amongst others be used for aquatic applications, such as marine applications.

In embodiments, light guide element comprises the second layer element in contact with the second light guide face, wherein the second layer element comprises a first adhesive layer in contact with the external surface (of the object).

Herein, the phrase "object that during use is at least partly submerged in water" especially refers to objects such as vessels and infrastructural objects that have aquatic applications. Hence, during use such object will be in general in contact with the water, like a vessel in the sea, a lake, a canal, a river, or another waterway, etc.

The term "vessel" may e.g. refer to e.g. a boat or a ship, etc., such as a sail boat, a tanker, a cruise ship, a yacht, a ferry, a submarine, etc. etc.

The term "infrastructural object" may especially refer to aquatic applications that are in general arranged substantially stationary, such as a dam, a sluice, a pontoon, an oilrig, etc. etc. The term "infrastructural object" may also refer pipes (for e.g. pumping up ocean water to e.g. a power plant), and other parts of (hydro-electrical) power plants, such as cooling systems, turbines, etc.

The term "object" may in embodiments refer to a support structure for a sea-going or a sea-based wind turbine, an oil rig, a structure for harvesting wave/tidal energy, a floating device, etc.

The term "external surface" especially refers to the surface that may be in physical contact with water. In the case of pipes this may apply to one or more of the internal pipe surface and the external pipe surface. Hence, instead of the term "external surface" also the term "fouling surface" may be applied. Further, in such embodiments the term "water line" may also refer to e.g. filling level.

Especially, the object is an object configured for marine applications, i.e. application in or near to a sea or an ocean. Such objects are during their use at least temporarily, or substantially always, at least partly in contact with the water. The object may be at least partly below the water (line) during use, or may substantially be all of its time below the water (line), such as for submarine applications. The invention may e.g. be applied for marine anti-fouling, keeping wetted surfaces clean, for off-shore applications, for (sub) sea applications, for drilling platforms, etc.

Due to this contact with the water, biofouling may occur, with the above indicated disadvantages. Biofouling will occur at the surface of an external surface ("surface) of such object. The surface of an (element of the) object to be protected may comprise steel, but may optionally also comprise another material, such as e.g. selected from the group consisting of wood, polyester, composite, aluminium, rubber, hypalon, PVC, glass fiber, etc. Hence, instead of a steel hull, the hull may also be a PVC hull or a polyester hull, etc. Instead of steel, also another iron material, such as an (other) iron alloys may be used Herein, the term "fouling" or "biofouling" or "biological fouling" are interchangebly used. Above, some examples of fouling are provided. Biofouling may occur on any surface in water, or close to water and being temporarily exposed to water (or another electrically conductive aqueous liquid). On such surface biofouling may occur when the element is in, or near water, such as (just) above the water line (like e.g. due to splashing water, such as for instance due to a bow wave). Between the tropics, biofouling may occur within hours. Even at moderate temperatures, the first (stages of) fouling will occur within hours; as a first (molecular) level of sugars and bacteria.

The anti-biofouling system comprises at least an UV-emitting element. Further, the anti-biofouling system may comprise a control system (see also below), an electrical energy supply, etc.

The term "anti-biofouling system" may also refer to a plurality of such systems, optionally functionally coupled to each other, such as e.g. controlled via a single control system. Further, the anti-biofouling system may comprise a plurality of such UV-emitting elements. Herein, the term "UV-emitting element" may (thus) refer to a plurality of UV-emitting elements. For instance, in an embodiment a plurality of UV-emitting elements may be associated to an external surface of the object, such as a hull, or may be comprised by such surface (see also below), whereas e.g. a control system may be configured somewhere within the object, such as in a control room or wheel house of a vessel.

The surface or area on which fouling may be generated is herein also indicated as fouling surface. It may e.g. be the hull of a ship and/or an emission surface of an optical medium (see also below). To this end, the UV-emitting element provides UV radiation (anti-fouling light) that is applied to prevent formation of biofouling and/or to remove biofouling. This UV radiation (anti-fouling light) especially at least comprises UV radiation (also indicated as "UV light"). Hence, the UV-emitting element is especially configured to provide UV radiation. Thereto, the UV-emitting element comprises a light source. The term "light source" may also relate to a plurality of light sources, such as 2-200 (solid state) light sources, such as LEDs, though many more light sources may also be applied. Hence, the term LED may also refer to a plurality of LEDs. Especially, the UV-emitting element may comprise a plurality of light sources. Hence, as indicated above, the UV-emitting element comprises one or more (solid state) state light sources. The LEDs may be (OLEDs or) solid state LEDs (or a combination of these LEDs). Especially, the light source comprises solid state LEDs. Hence, especially, the light source comprises a UV LED configured to provide one or more of UVA and UVC light (see also below). UVA may be used to impair cell walls, whereas UVC may be used to impair DNA. Hence, the light source is especially configured to provide the UV radiation. Herein, the term "light source" especially refers to a solid state light source. The light source(s) may also include (a) solid state laser(s).

Especially, the light source or the light sources is (are) LEDs. Hence, in embodiments the anti-biofouling system comprises a plurality of light sources, wherein the light sources comprise LEDs. Alternatively or additionally, the light sources comprise solid state lasers.

As indicated above, the UV-emitting element is especially configured to irradiate with said UV radiation (during an irradiation stage) one or more of (i) said part of said external surface and (ii) water adjacent to said part of said external surface. The term "part" refers to part of the external surface of an object, such as e.g. a hull or a sluice (door). However the term "part" may also refer to substantially the entire external surface, such as the external surface of the hull or sluice. Especially, the external surface may comprise a plurality of parts, which may be irradiated with the UV light of one or more light sources, or which may be irradiated with the UV radiation of one or more UV-emitting elements. Each UV-emitting element may irradiate one or more parts. Further, there may optionally be parts that receive UV radiation of two or more UV-emitting elements.

In general, there may be distinguished between two main embodiments. One of the embodiments includes the part of the external surface being irradiated with the UV radiation with between the light source and UV-emitting element water (or air when above the water line), such as sea water, at least during the irradiation stage. In such embodiment, the part is especially comprised by the "original" external surface of the object. However, in yet another embodiment, the "original" external surface may be extended with a module, especially a relatively flat module, that is attached to the "original" external surface of the object (such as the hull of a vessel), whereby the module itself forms in fact the external surface. For instance, such module may be associated to the hull of a vessel, whereby the module forms (at least part of) the external surface. In both embodiments the UV-emitting element especially comprises a radiating exit surface (see further also below). However, especially in the latter embodiment wherein the UV-emitting element may provide part of said external surface, such radiation exit window may provide the part (as the first part and the radiation exit window may essentially coincide; especially may be the same surface).

Hence, in an embodiment the UV-emitting element is attached to said external surface. In yet a further specific embodiment the radiation exit window of the anti-biofouling system is configured as part of said external surface. Hence, in some of the embodiments the object may comprise a vessel comprising a hull, and the UV-emitting element is attached to said hull. The term "radiation exit window" may also refer to a plurality of radiation exit windows (see also below).

In both general embodiments, the UV-emitting element is configured to irradiate with said UV radiation (during an irradiation stage) water adjacent to said part of said external surface. In the embodiments wherein the module itself forms in fact the external surface, the UV-emitting element is at least configured to irradiate with said UV radiation (during an irradiation stage) said part of said external surface, as it is in fact part of said external surface, and optionally also water adjacent to said part of said external surface. Hereby, biofouling may be prevented and/or reduced.

In an embodiment, a significant amount of a protected surface to be kept clean from fouling, preferably the entire protected surface, e.g. the hull of a ship, may be covered with a layer that emits germicidal light ("anti-fouling light"), in particular UV light.

In yet another embodiment, the UV radiation (anti-fouling light) may be provided to the surface to be protected via a waveguide, such as a fiber.

Hence, in an embodiment the anti-fouling lighting system may comprise an optical medium, wherein the optical medium comprises a waveguide, such as an optical fiber, configured to provide said UV radiation (anti-fouling light) to the fouling surface. The surface of e.g. the waveguide from which the UV radiation (anti-fouling light) escapes is herein also indicated as emission surface. In general, this part of the waveguide may at least temporarily be submerged. Due to the UV radiation (anti-fouling light) escaping from the emission surface, an element of the object that is during use at least temporarily exposed to the liquid (such as seawater), may be irradiated, and thereby anti-fouled. However, the emission surface per se may also be anti-fouled. This effect is used in some of the embodiments of the UV-emitting element comprising an optical medium described below.

Embodiments with optical media are also described in WO2014188347. The embodiments in WO2014188347 are herein also incorporated by reference as they are combinable with the control unit and/or water switch, and other embodiments, described herein.

As indicated above, the UV-emitting element may especially comprise a UV radiation exit window. Hence, in a specific embodiment the UV-emitting element comprises a UV radiation exit window, with the UV-emitting element especially being configured to provide said UV radiation downstream from said UV radiation exit window of said UV-emitting element. Such UV radiation exit window may be an optical window through which the radiation escapes from the UV-emitting element. Alternatively or additionally, the UV radiation exit window may be the surface of a waveguide. Hence, UV radiation may be coupled in the UV-emitting element into the waveguide, and escape from the element via a (part of a) face of the waveguide. As also indicated above, in embodiments the radiation exit window may optionally be configured as part of the external surface of the object.

As indicated above, the object or the anti-biofouling system may comprise a plurality of radiation exit windows. In embodiments this may refer to a plurality of anti-biofouling systems. However, alternatively or additionally, in embodiments this may refer to an anti-biofouling system comprising a plurality of UV emitting elements. Such anti-biofouling system may thus especially include a plurality of light sources for providing UV radiation. However, alternatively or additionally, in embodiments this may (also) refer to an UV-emitting element comprising a plurality of light sources configured to provide the UV radiation. Note that an UV-emitting element with a single UV radiation exit window may (still) include a plurality of light sources.

The anti-biofouling system is especially configured to provide UV radiation to the part of the object or to water adjacent to this part. This especially implies that during an irradiation stage the UV radiation is applied. Hence, there may optionally also be periods wherein no UV radiation is applied at al. This may (thus) not only be due to e.g. a control system switching of one or more of the UV-emitting elements, but may e.g. also be due to predefined settings such as day and night or water temperature, etc. For instance, in an embodiment the UV radiation is applied in a pulsed way.

Hence, in a specific embodiment or aspect, the anti-biofouling system is configured for preventing or reducing biofouling on a fouling surface of an object, that during use is at least temporarily exposed to water, by providing an anti-fouling light (i.e. UV radiation) to said fouling surface or water adjacent thereto. Especially, the anti-biofouling system may be configured to provide said anti-fouling light via an optical medium to said fouling surface, wherein the UV-emitting element further comprises (ii) said optical medium configured to receive at least part of the UV radiation (anti-fouling light), the optical medium comprising an emission surface configured to provide at least part of said UV radiation (anti-fouling light). Further, especially the optical medium comprises one or more of a waveguide and an optical fiber, and wherein the UV radiation (anti-fouling light) especially comprises one or more of UVB and UVC light. These waveguides and optical media are herein further not discussed in detail.

The optical medium may also be provided as a (silicone) foil for applying to the protected surface, the foil comprising at least one light source for generating anti-fouling light and a sheet-like optical medium for distributing the UV radiation across the foil. In embodiments the foil has a thickness in an order of magnitude of a couple of millimeters to a few centimeters, such as 0.1-5 cm, like 0.2-2 cm. In embodiments, the foil is not substantially limited in any direction perpendicular to the thickness direction so as to provide substantially large foil having sizes in the order of magnitude of tens or hundreds of square meters. The foil may be substantially size-limited in two orthogonal directions perpendicular to the thickness direction of the foil, so as to provide an anti-fouling tile; in another embodiment the foil is substantially size-limited in only one one direction perpendicular to a thickness direction of the foil, so as to provide an elongated strip of anti-fouling foil. Hence, the optical medium, and even also the UV-emitting element, may be provided as tile or as strip. The tile or strip may comprise a (silicone) foil.

In an embodiment the UV-emitting element comprises a two-dimensional grid of light sources for generating UV radiation and the optical medium is arranged to distribute at least part of the UV radiation from the two-dimensional grid of light sources across the optical medium so as to provide a two-dimensional distribution of UV radiation exiting the light emitting surface of the light module. The two-dimensional grid of light sources may be arranged in a chicken-wire structure, a close-packed structure, a rows/columns structure, or any other suitable regular or irregular structure. The physical distance between neigboring light sources in the grid may be fixed across the grid or may vary, for example as a function of light output power required to provide the anti-fouling effect or as function of the location of the UV-emitting element on the protected surface (e.g location on the hull of a ship). Advantages of providing a two-dimensional grid of light sources include that the UV radiation may be generated close to the areas to be protected with UV radiation illumination, and that it reduces losses in the optical medium or light guide and that it is increasing homogeneity of the light distribution. Preferably, the UV radiation is generally homogeneously distributed across the emission surface; this reduces or even prevents under-illuminated areas, where fouling may otherwise take place, while at the same time reducing or preventing energy waste by over-illumination of other areas with more light than needed for anti-fouling. In an embodiment, the grid is comprised in the optical medium. In yet another embodiment, the grid may be comprised by a (silicone) foil.

Further, in an embodiment the optical medium may be disposed proximate (including optionally attached to) to the protected surface and coupled to receive the ultraviolet light, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

In a further aspect, the invention also provides a method of anti-(bio)fouling (a part of) an external surface of an object that is during use at least temporarily exposed to water, the method comprising: providing the anti-biofouling system as defined herein to the object, generating the UV radiation (during use of the object), optionally as function of one or more of (i) a feedback signal, and (ii) a timer for (periodically) varying the intensity of the UV radiation (anti-fouling light), and providing said UV radiation (during an irradiation stage) to (the part of) the external surface. Such feedback signal may be provided by the sensor.

In yet a further aspect, the invention also provides a method of providing an anti-biofouling system to an object, that during use is at least temporarily exposed to water, the method comprising providing, such as integrating in the object and/or attaching to an external surface, the anti-biofouling system to the object, such as a vessel, with the UV-emitting element configured to provide said UV radiation to one or more of a part of an external surface of the object and water (being) adjacent to said part (during use). Especially, the UV-emitting element is attached to the external surface, or may even be configured as (first) part of the external surface.

With the herein described invention, a surface may be treated such with anti-biofouling radiation that biofouling is reduced or prevented. Hence, in yet a further aspect the invention also provides a method of preventing and/or reducing biofouling at a surface of a light guide element associated to the external surface of the object as defined herein, the method comprising generating UV radiation and providing said UV radiation to the surface while at least part of the UV radiation escapes from the light guide element via the surface. In yet a further aspect, the invention provides a method of preventing and/or reducing biofouling at an external surface of an object, the external surface during use of the object being at least temporarily exposed to water, the method comprising generating UV radiation by an anti-biofouling system (such as described herein) and providing said UV radiation to the external surface of the object and water adjacent to the external surface, wherein the anti-biofouling system comprises a light guide element as described herein. The light guide element can be used to provide the UV radiation to the surface of the object or the light guide element may provide the surface of the object.

The term "associate" and similar terms may refer to a functional coupling of elements. For instance, the light guide element may be coated to an object or may be attached to an object such as with one or more of mechanical means, glue, an adhesive, etc. The term "associate" and similar terms in the context of a light source may also refer to e.g. a radiational coupling, in the sense that an element and a light source may be associated such that the element receives at least part of the light source radiation.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily to scale.

DETAILED DESCRIPTION OF THE EMBODIMENTS

Figure 1A:
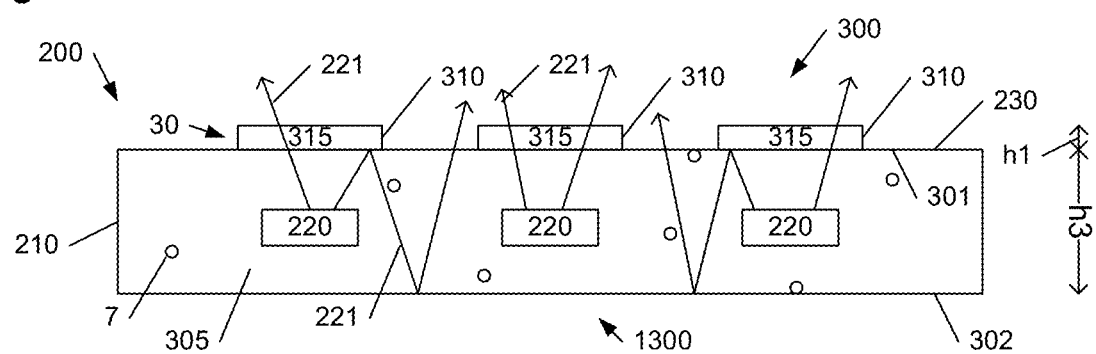
FIGS. 1a-1h schematically depict some general aspects.
Figure 1B:
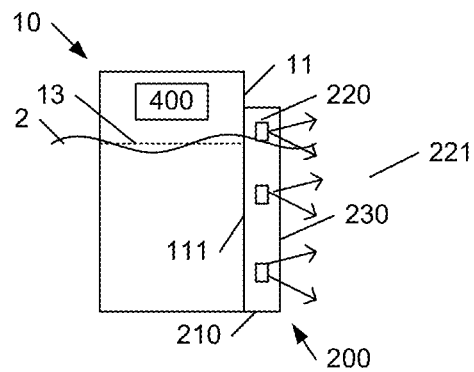

FIG. 1a schematically depicts an embodiment of an anti-biofouling system 200 which comprises an UV-emitting element 210. The UV-emitting element 210 comprises a UV radiation exit window 230. The UV-emitting element 210 at least partly encloses a light source 220 configured to provide UV radiation 221 (anti-fouling light). Here, by way of example three light sources 220 are depicted. Here, the UV-emitting element 210 is configured as waveguide or light guide, with elements embedded therein. Hence, the light sources 220 are—in this schematically depicted embodiment—embedded in the waveguide. The UV radiation exit window 230 is configured to transmit at least part of the UV radiation 221 of the light source 220. The combination of the light guide 210 and the light sources 220 are hereinafter referred to as light guide 300. The light guide 300 comprises a light guide face 301, which comprises the radiation exit window 230. The light guide 300 may especially be a plate with the light guide face 301 and a face opposite thereof, indicated with second light guide face 302. The distance between those faces may define a thickness or height of the light guide 300, indicated with reference h3 (the length and width (see also FIG. 2e, may be much larger than the height). The second face 302 may include a reflective layer.

A layer element 30 comprising an optical layer 310 is situated on the light guide 300, and the combination of this layer element 30 and the light guide 300 is hereinafter referred to as the light guide element 1300. The optical layer 310 is in contact with at least part of the light guide face 301. The optical layer is in physical contact with at least part of the light guide face. Especially, the optical layer 310 has a first index of refraction n1 smaller than 1.36 at 280 nm. Further, the light guide 1300 comprises a UV radiation transmissive light guide material 305 (such as a silicone). The optical layer 310 comprises an optical layer material 315. This optical layer material 315 is especially transmissive for UV radiation but has an index of refraction smaller than water. In this way, the layer reduces outcoupling from the UV radiation when the light guide element 1300 is applied in aquatic environments, and may enhance outcoupling of radiation at other parts of the light guide face. Here, by way of example the light guide 300 comprises optical structures 7. These may be within the guide or at the faces of the light guide 300. The optical structures 7 may be configured to provide an even distribution of the UV radiation 221 escaping from the UV emitting element 210. Here, the light sources 220 are depicted as being comprised by the light guide element 1300; however, this is not necessarily the case (see also FIG. 2c).

The light guide element 210 in combination with the light source(s) 220 can e.g. be used as lighting module for anti-fouling of a (protected) surface. Such module may comprise (thus) at least one light source for generating an anti-fouling light, an optical medium for distributing at least part of the anti-fouling light through the optical medium, the optical medium comprising an emission surface for emitting the distributed anti-fouling light in a direction away from the protected surface when the lighting module is arranged in, on and/or near the protected surface. The the emission surface may be a substantially planar surface. The emission surface is the UV radiation exit window 230 including the layer element 30.

Figure 1C:
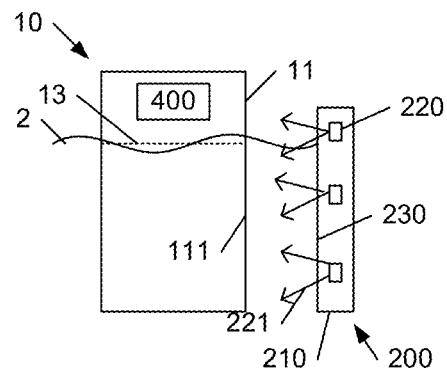

FIGS. 1a-1d schematically depict embodiments of an object 10 that during use is at least partly submerged in water 2, see the water line 13. The object 10, such as a vessel or a sluice, see also below, further comprises an anti-biofouling system 200 comprising an UV-emitting element 210, especially for application of UV radiation 221 to a part 111 of an external surface 11 of the object 10, such as a hull or part or a hull. Here, two embodiments are shown wherein the anti-biofouling system 200, or more especially the UV-emitting element 210 is part of an outer surface, and thereby forms in fact part of the outer surface (FIG. 1a) or wherein the UV-emitting element 210 is configured to irradiate the outer surface and does not necessarily form part of an outer surface, such as a hull of a ship (FIG. 1c). For instance, the object 10 is selected from the group consisting of a vessel 1 and an infrastructural object 15 (see also below). Reference 400 in amongst others FIG. 1b refers to a control system, which may in embodiments control the light source(s) 220 of the anti-biofouling system 200.

The UV-emitting element 210 comprises one or more light sources 220 and may thus especially be configured to irradiate with said UV radiation 221 during an irradiation stage one or more of (i) said part 111 of said external surface 11 and (ii) water adjacent to said part 111 of said external surface 11. The former variant applies especially the embodiment of FIG. 1c, and the latter embodiment especially applies to both embodiments of FIGS. 1b-1c. Note however that when an external surface of the UV-emitting element 210 is configured as external surface of the object 10, of course the part 111 is irradiated per se with the UV radiation 21.

Hence, the UV-emitting element 210 comprises a UV radiation exit window 230 and the UV-emitting element 210 is configured to provide said UV radiation 221 downstream from said UV radiation exit window 230 of said UV-emitting element 210.

Figure 1D:
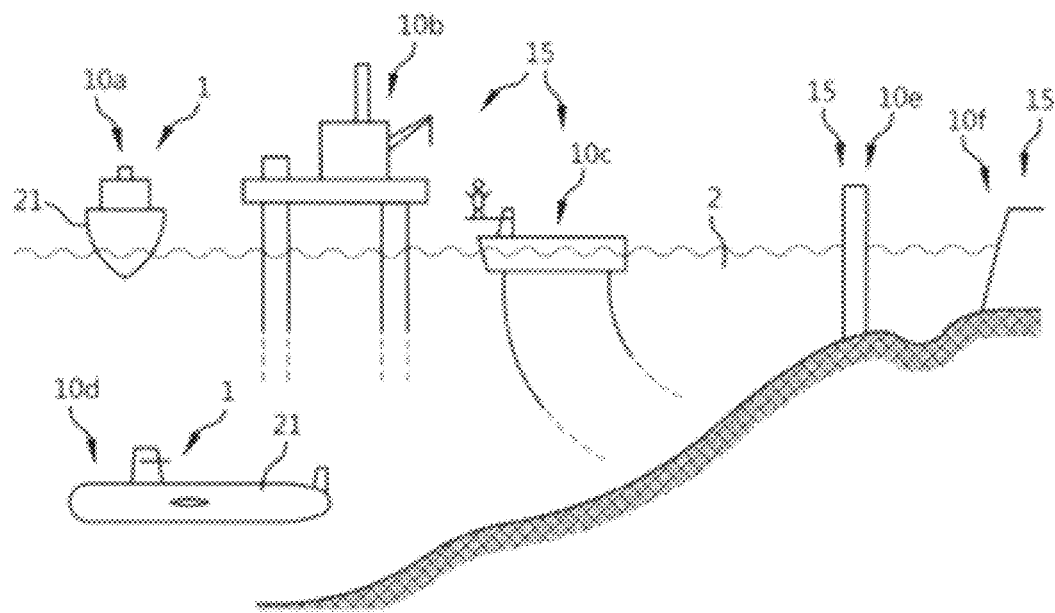

As indicated above, the term "vessel", indicated with reference 1, may e.g. refer to e.g. a boat or a ship (ref 10a in FIG. 1d), etc., such as a sail boat, a tanker, a cruise ship, a yacht, a ferry, a submarine (ref. 10d in FIG. 1d), etc. etc., like schematically indicated in FIG. 1d. The term "infrastructural object", indicated with reference 15, may especially refer to aquatic applications that are in general arranged substantially stationary, such as a dam/sluice (references 10e/10f in FIG. 1d), a pontoon (ref. 10c in FIG. 1d), an oilrig (ref. 10b in FIG. 1d), etc. etc.

Figure 1E:
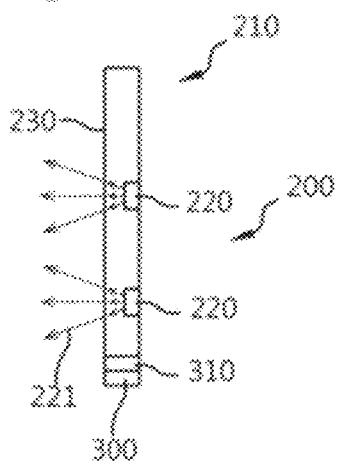

FIG. 1e schematically depicts in more detail an embodiment of the anti-biofouling system 200, here by way of example including an integrated control system 400 and an integrated sensor 410.

Figure 1F:
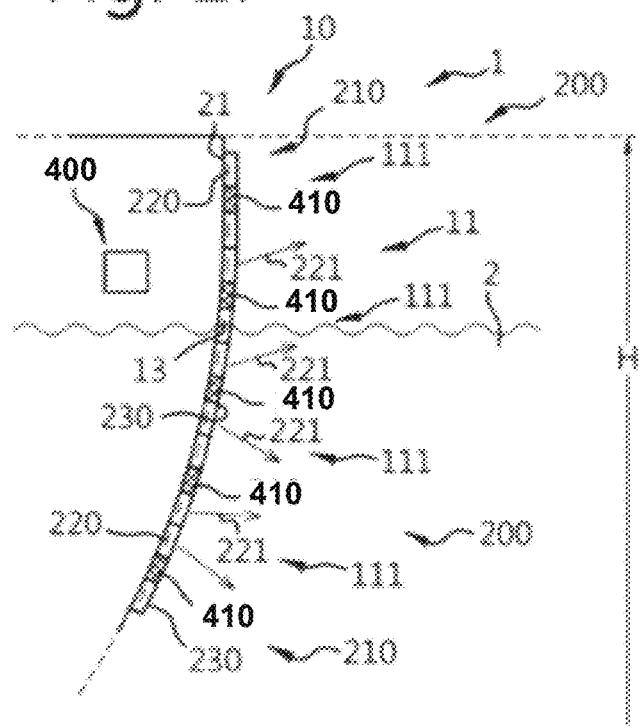

FIG. 1f schematically depicts an external surface 11 of an object 10, such as a vessel wall or a wall of an infrastructural object, with by way of example a plurality UV-emitting elements 210 (here associated to a hull 21 of a vessel 1). Alternatively or additionally, a plurality of functionally coupled or independently functioning anti-biofouling systems 200 may be applied.

FIG. 1f also schematically depicts the embodiment wherein the anti-biofouling system 200 comprises a plurality of UV-emitting elements 210 (with a plurality of light sources), a plurality of radiation exit windows 230, and a plurality of said parts 111, wherein the plurality of light sources 220 are configured to provide said UV radiation 221 via said plurality of radiation exit windows 230 to said plurality of parts 111, and wherein said plurality of parts 111 are configured at different heights of the object 10, and wherein the control system 400 is configured to control the light sources 220 individually as function of said input information. For instance, in an embodiment the control system 400 may be configured to control the light sources 220 individually as function of the positions of the parts 111 of the external surface 11 relative to the water.

Figure 1G:
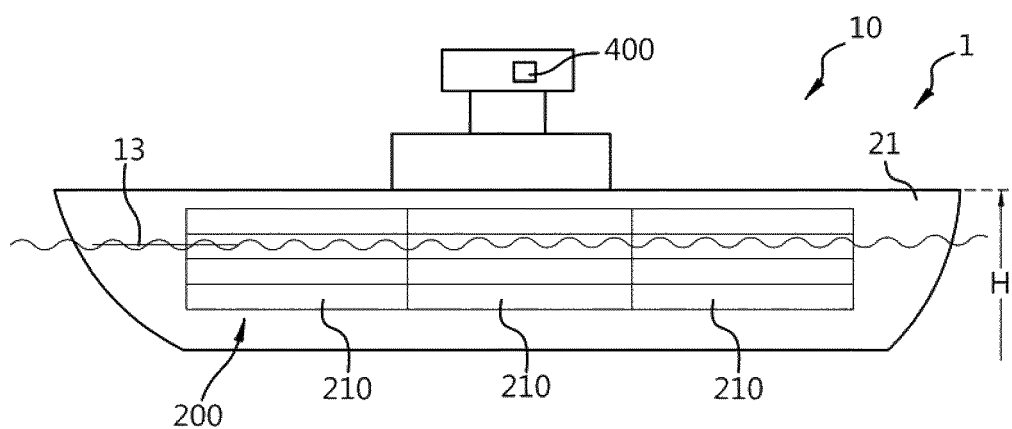

FIG. 1g schematically depicts an embodiment wherein a vessel 1, as embodiment of the object 10, comprises a plurality of anti-biofouling systems 200 and/or a one or more of such anti-biofouling systems 200 comprising a plurality of UV-emitting elements 210. Dependent upon the height of the specific such anti-biofouling system 200 and/or the height of the UV-emitting elements 210, such as relative to a water (line), the respective UV-emitting elements 210 may be switched on.

Figure 1H:
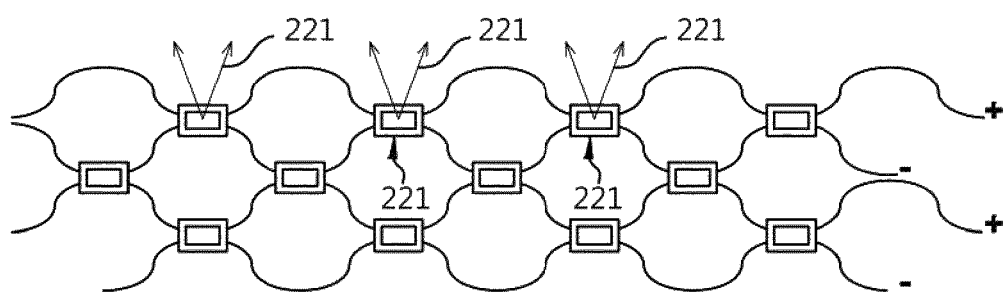

FIG. 1h shows a chicken-wire embodiment where light sources 210, such as UV LEDs, are arranged in a grid and connected in a series of parallel connections. The LEDs can be mounted at the nodes either through soldering, glueing or any other known electrical connection technique for connecting the LEDs to the chicken wires. One or more LEDs can be placed at each node. DC or AC driving can be implemented. If AC is used, then a couple of LEDs in anti parallel configuration may be used. The person skilled in the art knows that at each node more than one couple of LEDs in anti parallel configuration can be used. The actual size of the chicken-wire grid and the distance between UV LEDs in the grid can be adjusted by stretching the harmonica structure. The chicken-wire grid may be embedded in an optical medium. Above, especially active prevention applications are described, wherein the anti-biofouling system 200 switches off, or switches specific UV-emitting elements 210 or specific light sources 220 off, dependent upon contact with the water, a signal of a sensor, etc. etc. However, alternatively or additionally, also warning signals or messages may be used to warn a person of danger.

Figure 2A:
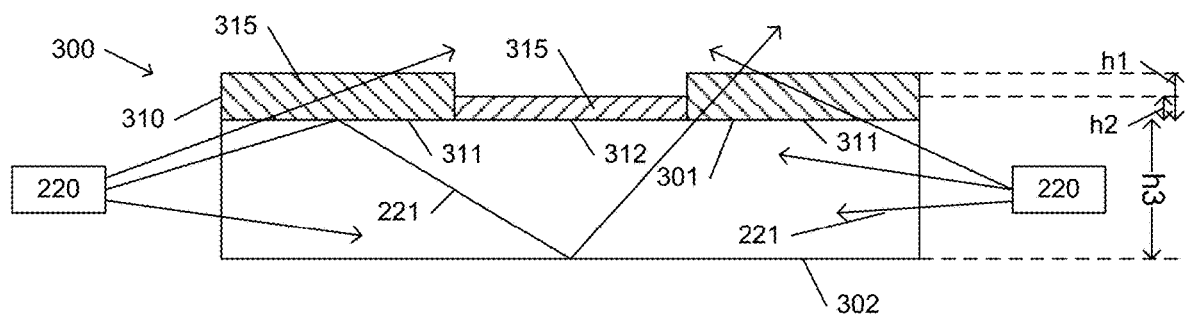
FIGS. 2a-2f schematically depict some embodiments.

FIG. 2a schematically depicts an embodiment wherein the optical layer 310 is a patterned optical layer 310. One or more first regions 311 may comprising said optical layer material 315 with a first layer thickness h1. One or more second regions 312 may comprising said optical layer material 315 with a second layer thickness h2 in the range of $0 \leq h2 < h1$. Here, $h2 \neq 0$. Note that the different regions may comprise different optical layer materials 315 or the same optical layer materials. Especially when the entire first light guide face is in physical contact with the optical layer 310, the optical layer 310 comprises UV radiation transmissive optical layer material 315. The thickness of the layer (h1, h1 and h2) may depend upon the distance to the closest light source; especially closer to a light source $h1 \neq 0$ and further away from the light source in embodiments h2=0. The transmission of the UV radiation through the optical layer (i.e. through height h1 (and/or h2)) is especially at least 10%, such as even more especially at least 20%, such as at least 40%, like in the range of 40-95%, or even higher (i.e. for UV radiation that is not directed back into the light guide 300). This especially applied to UV radiation propagating in a direction substantially perpendicular to the first light guide face 301 (in a direction away from the light guide and thus through the optical layer with the indicated layer height h1 (or h2; if any)).

Figure 2B:
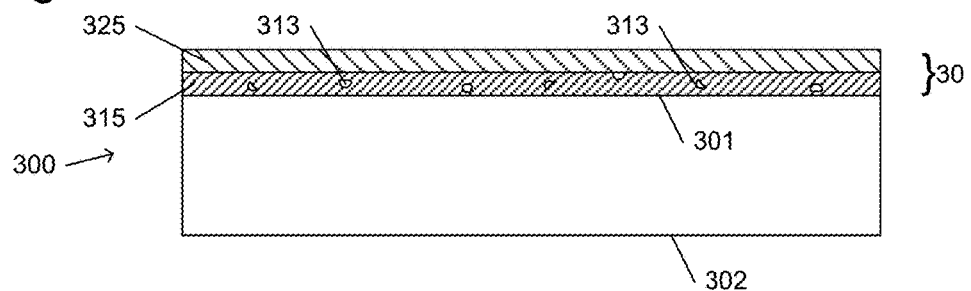

Further, here by way of example a first region and a second region are indicated. Also more than two different regions may be applied FIG. 2b schematically depicts a combination of embodiments. Amongst others, this drawing schematically depicts a porous optical layer 310. The optical layer includes pores or cavities, indicated with reference 313. These may be filled with a gas, such as a noble gas or air. Further, the first layer element 30 comprises a layer stack 3 comprising said optical layer 310 and further comprising a second layer 320 in contact with at least part of said optical layer 310. In embodiments, the second layer 320 is water impermeable.

Especially when the second layer covers substantially the entire first light guide face, the second layer 320 comprises a UV radiation transmissive optical layer material 325. As indicated above, the optical layer may be configured over the entire first light guide face, such as in FIG. 2b, but may in other embodiments also be available on only part of the first light guide face, such as in FIG. 1a.

Figure 2C:
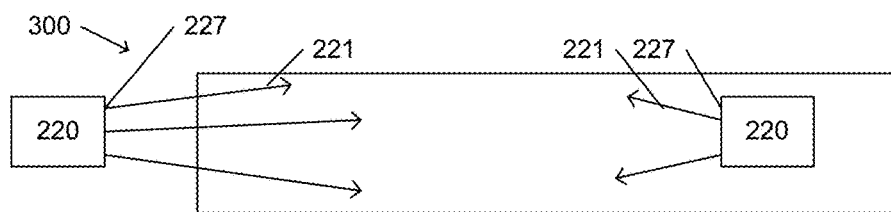

FIG. 2c schematically depicts variants wherein the light source 220 is configured external from the light guide 300 (left) and configured at least partly within the light guide 300. The light source 220 comprises a light emitting face 227. In the latter variant, the light emitting face 227 is configured within the light guide 300.

Figure 2D:
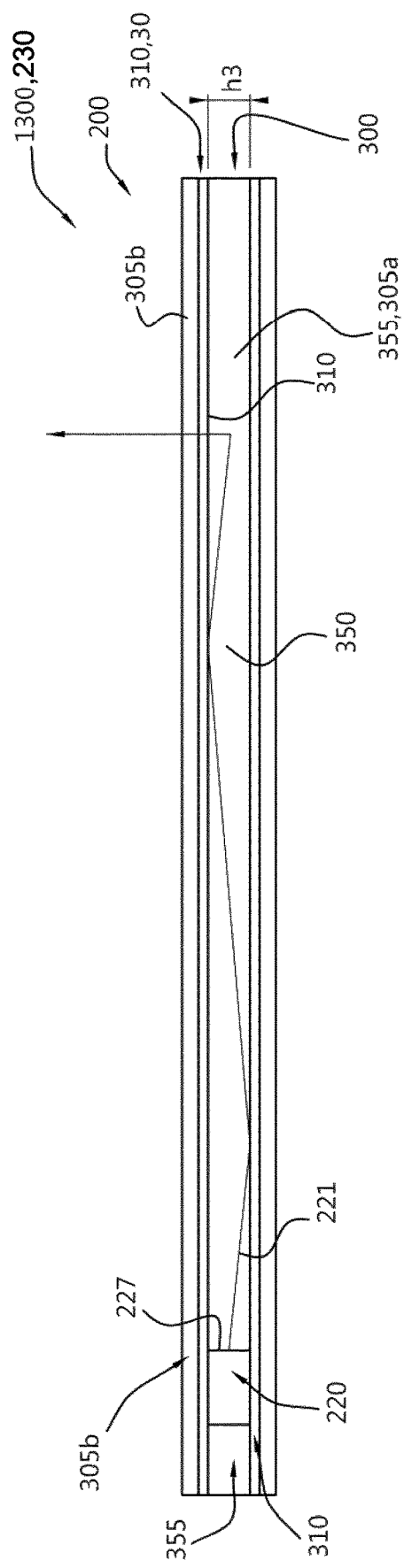

FIG. 2d schematically depicts an embodiment wherein the light guide 300 comprises a closed cavity 350 filled with a UV radiation transmissive liquid 305a. The light guide 300 may in this embodiment comprises a first material 305b, especially comprising silicone. The first material 305b may define the cavity 350. Here, in fact the optical layer 310 may define the cavity 350. The UV radiation transmissive liquid 305a may e.g. comprise demineralized water. Would such light guide element 1300 be used in the anti-biofouling system, the system may include a pump for moving, such as circulating, the liquid 305a. Such pump may be controlled by the herein mentioned control system.

Figure 2E:
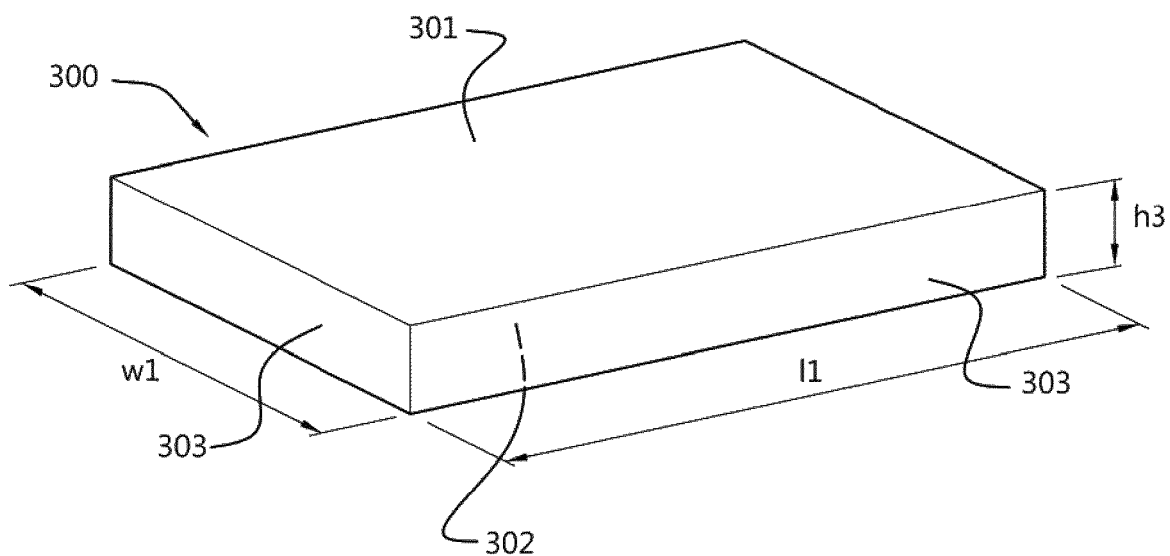
Figure 2F:
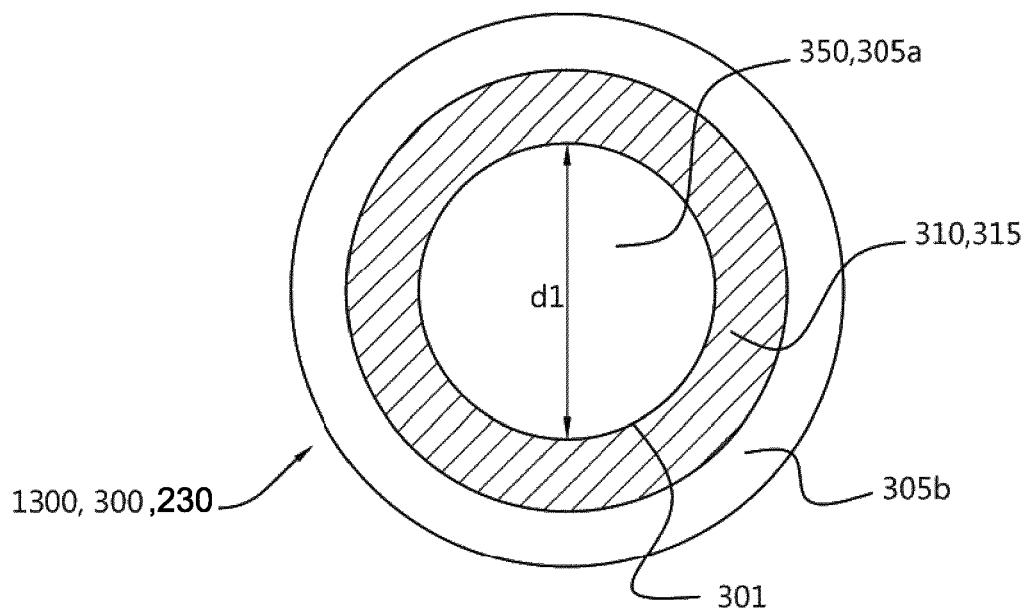

FIGS. 2e and 2f very schematically depicts two variants of the light guide 300, with an elongated plate, such as a silicone plate (which may effectively be a coating on an object), or a channel like system. The diameter of the latter is defined as d1. The dimension of the diameter may be substantially the same as those defined herein for the height h3 of the light guide 300. With respect to the former variant, the light guide may have a height substantially smaller than a length or a width, such as at least 5 times smaller. In FIG. 2e, the length of the plate is indicated with reference l1 and the width is indicated with reference w1. Especially, $w1/h3 \geq 5$ and $l1/h3 \geq 5$. The top face, here the first light guide face 301 (optical layer not indicated) may be used as outcoupling face. The face opposite of the first light guide face 301 is indicated with reference 302, and is here the bottom face. This face may include a reflector. The edge(s) 303 may be used to couple light UV radiation into the light guide 300, assuming light sources external from the light guide 300. Edges not used, and/or in embodiments wherein the light sources have light emitting faces within the light guide 300, the edge(s) 303 may include reflective material. The length of the light guide 300 in FIG. 2f is perpendicular to the diameter and along an axis of elongation of the light guide. Hence, the light guide may in embodiments be a fiber.

Figure 3:
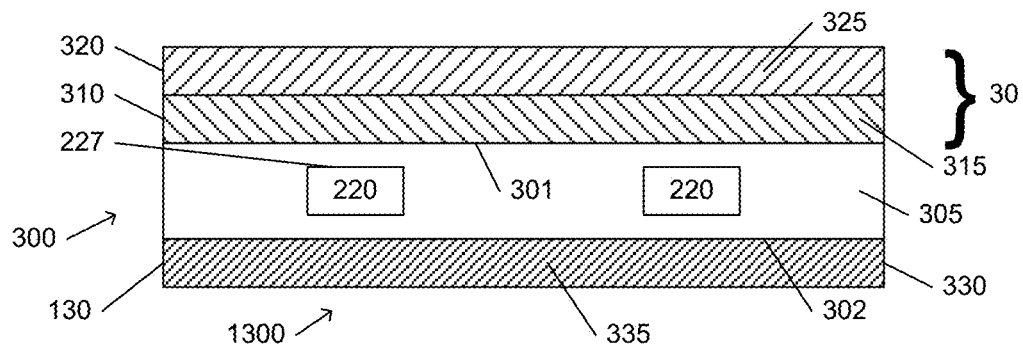
FIG. 3 schematically depicts some variants which may be applied, optionally in combination.

FIG. 3 schematically depicts a further embodiment of the light guide element 1300 of the anti-biofouling system 200, wherein a plurality of variants are included, which may independently be used or which may be applied in combination.

For instance, in this schematically depicted embodiment the light source 220 are at least partially, here essentially entirely, embedded in the light guide 300. Hence, the light source(s) comprise a light emitting face 227, wherein the light emitting face 227 is configured within the light guide 300. Especially, the light emitting face is the die of a solid state light source (220).

Further, the light guide element 1300 comprises a first stack 30, comprising at least a layer, here by way of example two layers, wherein a first layer is the optical layer 310, and wherein a second layer 320 may e.g. be used as protective layer. The optical layer 310 is in contact with the first light guide surface 301. The optical layer material 315 and the second layer material, indicated with reference 325, is especially transmissive for UV radiation.

Alternatively or additionally, a second stack 130, comprising a least a layer, here by way of example a single layer, indicated as third layer 330, is available. The layer stack, here the third layer 130, is in contact with the second light guide surface 301. The third layer may comprise third layer material 335, which may in embodiments be identical to the optical layer material 315, but which in other embodiments may be essentially reflective, and/or which may in other embodiments be adhesive. For instance, the third layer 330 may be applied to arrange the light guide element 1300, more precisely the light guide layer 300 to an external surface 11 of an object.

The light guide 300 has a first light guide surface 301. When the first layer element 30 is available, the external surface of the light guide element 1300 is now effectively a surface of an external layer, herein indicated as 1301. Hence, reference 1301 indicates an outer layer of the light guide element 1300. The radiation exit window can be considered the layer (stack) between first light guide surface 301 and the outer layer 1301.

Hence, there may be a top layer or top foil and/or there may be a bottom layer or top foil. The former may be indicated more general as optical layer, or may be more general be comprised by a layer stack. The latter may be indicated more general as third layer, or may be more general comprise by a second layer stack.

The top foil/layer may especially be applied to protect the light carrier against mechanical damage. Further, it may be to be sufficiently transparent for UVC.

The optical layer, or the (first) layer stack may provide protection against chemical intrusion of unwanted molecules which may destroy the transparency of the light carrier.

The second layer may especially have a good resistance against tear. The second layer may have a lower refraction index compared to silicone to propagate the UVC light further through the silicone before it is emitted to the surface. This becomes more important if the silicone layer is very thin (≤2 mm) or if the silicone is highly transparent.

This effect may also be obtained by adding a sol-gel layer, as embodiment of the optical layer, in between the light carrier and the top foil (see also above).

The bottom foil may especially be applied to reflect light back to the surface, into the light guide. The third layer may be a chemical interface enabling us to attach other layers to it at the bottom side, such as lead frames carrying wires and electronics.

Also the third layer may have a lower refraction index compared to silicone to propagate the UVC light further through the silicone before it is emitted to the surface. This effect may also be obtained by adding a sol-gel layer (see also above), as embodiment of the optical layer, in between the light carrier and the third layer.

Suitable materials for the second layer or for the third layer or for both the second layer and the third layer may be selected from the group of PET (Polyethylene terephthalate) and FEP (Fluorinated ethylene propylene). Other materials may also be possible, such as one or more of fluorinated ethylene, fluorinated propylene, fluorinated ethylene propylene, and fluorinated propylene acetate. Alternatively or additionally, suitable materials for the second layer or for the third layer or for both the second layer and the third layer may be selected from silicone materials (but different from the light guide material in embodiments wherein the light guide material would also comprise a silicone). The materials of the second layer and third layer may be different.

The term "plurality" especially refers to two or more.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

The invention claimed is:

1. A light guide element comprising:
  a light guide, wherein the light guide comprises:
  a first light guide face;
  a second light guide face;
  a UV radiation transmissive light guide material,
    wherein the UV radiation transmissive light guide material is disposed between the first light guide face and the second light guide face;
  one or more of a first layer element, and
    wherein the first layer element is in contact with the first light guide face, wherein the first layer element is transmissive for UV radiation;
  one or more of a second layer element,
    wherein the second layer element is in contact with a surface of the first layer element,
    wherein the second layer element serves to protect the first layer and the light guide,
  wherein the first layer element comprises an optical layer, and
  wherein the optical layer has a refractive index that is at least 5% less than a refractive index of seawater at a wavelength of the UV radiation.

2. The light guide element according to claim 1, wherein the first layer element comprises a third layer, wherein the third layer comprises one or more of a silicone and a fluoropolymer, and wherein the third layer and the light guide have a different composition.

3. The light guide element according to claim 2, wherein the second layer comprises one or more of fluorinated ethylene, fluorinated propylene, fluorinated ethylene propylene, and fluorinated propylene acetate.

4. The light guide element according to claim 2, wherein the second layer comprises a silicone having a larger mechanical strength than the light guide.

5. The light guide element according to claim 1, wherein the ist second layer element has one or more functionalities selected from the group consisting of partly reflective for UV radiation, reinforcing the light guide element, and protective for the light guide.

6. The light guide element according to claim 5,
  wherein the second layer element is configured to impede ingress of UV-light absorbing organic molecules into the light guide, and
  wherein the first layer element has one or more of a larger compression strength, (ii) a larger tangent Modulus, and a larger toughness than the light guide.

7. The light guide element according to claim 1, wherein the optical layer is in contact with at least part of the first light guide face,
  wherein the optical layer comprises optical layer material,
  wherein the optical layer has a first index of refraction smaller than 1.36 at 280 nm,
  wherein the optical layer is a porous optical layer having a porosity in the range of 5-70%, and
  wherein the optical layer material comprises a sol-gel material.

8. The light guide element according to claim 1,
  wherein the second layer element comprises one or more second layer element layers, and
  wherein the one or more second layer element layers have one or more functionalities selected from the group consisting of reflective for UV radiation, and adhesive for adhering the light guide to an object.

9. The light guide element according to claim 1, wherein each of the first layer element and the second layer element comprise a layer have an index of refraction lower than the light guide.

10. An anti-biofouling system comprising:
  the light guide element according to claim 1; and
  a light source,
  wherein the anti-biofouling system comprises a radiation exit window,
  wherein the radiation exit window comprises the first light guide face,
  wherein the light source is configured to provide the UV radiation into the light guide, and
  wherein the radiation exit window is configured to transmit at least part of the UV radiation.

11. The anti-biofouling system according to claim 10,
  wherein the light source comprises a light emitting face,
  wherein the light emitting face is configured within the light guide,
  wherein a distance between the first light guide face and the second light guide face defines a thickness of the light guide,
  wherein the thickness is at maximum 5 mm,
  wherein the light guide element comprises the first layer element and the second layer element,
  wherein one or more of the first layer element and the second layer element comprise a fourth layer, and
  wherein the fourth layer comprises one or more of fluorinated ethylene, fluorinated propylene, fluorinated ethylene propylene, and fluorinated propylene acetate.

12. An object comprising:
  an external surface; and
  the anti-biofouling system according to claim 10,
  wherein the anti-biofouling system is associated with the external surface.

13. The object according to claim 12,
  wherein light guide element comprises a third layer element in contact with the second light guide face,
  wherein the third layer element comprises a first adhesive layer, and
  wherein the third layer element is in contact with the external surface.

14. A method of reducing biofouling at a surface of a light guide element, wherein the light guide element is associated with an external surface of an object, wherein the light guide comprises:
  a first light guide face;
  a second light guide face;
  a UV radiation transmissive light guide material,
    wherein the UV radiation transmissive light guide material is disposed between the first light guide face and the second light guide face;
  one or more of a first layer element, and wherein the first layer element is in contact with the first light guide face,
wherein the first layer element is transmissive for UV radiation; and
one or more of a second layer element,
  wherein the second layer element is in contact with the first layer element,
  wherein the second layer element serves to protect the first layer element and the light guide,
  wherein an anti-biofouling system comprises the light guide element and a light source,
  wherein the anti-biofouling system comprises a radiation exit window,
  wherein the radiation exit window comprises the first light guide face,
  wherein the light source is configured to provide the UV radiation into the light guide,
  wherein the first layer element comprises an optical layer,
  wherein the optical layer has a refractive index that is at least 5% less than a refractive index of seawater at a wavelength of the UV radiation
  wherein the radiation exit window is configured to transmit at least part of the UV radiation, and
  wherein the anti-biofouling system is associated with the external surface,
the method comprising:
  generating UV radiation; and
  providing the UV radiation to the external surface,
  wherein at least part of the UV radiation escapes from the light guide element via the external surface.

* * * * *